(12) United States Patent
Goyette et al.

(10) Patent No.: US 12,055,053 B1
(45) Date of Patent: Aug. 6, 2024

(54) ROTOR BLADE INSPECTION SYSTEM

(71) Applicant: Raytheon Technologies Corporation, Farmington, CT (US)

(72) Inventors: Scott Goyette, Moosup, CT (US); Janet Shaw, Tolland, CT (US); Gregory S. Hagen, Glastonbury, CT (US); Zaffir A. Chaudhry, South Glastonbury, CT (US); David L. Lincoln, Cromwell, CT (US); Jeffrey P. King, Coventry, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/136,132

(22) Filed: Apr. 18, 2023

(51) Int. Cl.
    *F01D 21/00*    (2006.01)
    *F01D 25/00*    (2006.01)

(52) U.S. Cl.
    CPC .......... *F01D 21/003* (2013.01); *F01D 25/002* (2013.01); *F05D 2220/36* (2013.01); *F05D 2270/02* (2013.01); *F05D 2270/8041* (2013.01)

(58) Field of Classification Search
    CPC .. F01D 21/003; F01D 25/002; F05D 2220/36; F05D 2260/80; F05D 2270/8041
    See application file for complete search history.

(56) References Cited

U.S. PATENT DOCUMENTS

| | | | |
|---|---|---|---|
| 7,064,811 B2 | 6/2006 | Twerdochlib | |
| 7,489,811 B2 | 2/2009 | Brummel | |
| 11,199,105 B2* | 12/2021 | Wang | H04N 23/11 |
| 2013/0335549 A1* | 12/2013 | Hatcher, Jr. | H04N 7/18 348/82 |
| 2014/0055596 A1* | 2/2014 | Hatcher, Jr. | H04N 7/185 348/82 |
| 2018/0156062 A1* | 6/2018 | Dede | B05D 1/02 |
| 2020/0056501 A1 | 2/2020 | Eastment | |

* cited by examiner

*Primary Examiner* — David E Sosnowski
*Assistant Examiner* — Aye S Htay
(74) *Attorney, Agent, or Firm* — Getz Balich LLC (57) ABSTRACT

An inspection system for fan rotor blades in a gas turbine engine is provided. The gas turbine engine has a sensor that provides a fan rotor stage speed signal. The system includes a plurality of cameras and light sources and a system controller. The cameras are controllable to image a leading edge of a fan rotor blade. Each respective camera and light source is mounted with a static structure disposed forward of the fan rotor blade stage. The system controller is in communication with stored instructions that when executed cause the system controller to monitor the speed of the fan rotor stage during an engine shutdown; upon the fan rotor stage speed reaching a first value, control the light sources to selectively illuminate the fan rotor blades, and control the cameras to image the fan rotor blades, and provide inspection information using signals representative of the captured images.

16 Claims, 5 Drawing Sheets

ROTOR BLADE INSPECTION SYSTEM

BACKGROUND OF THE INVENTION

1. Technical Field

The present disclosure relates to turbine engine rotor blade inspection in general, and to systems configured to inspect turbine engine rotor blades and provide inspection data in particular.

2. Background Information

The fan blades in a fan rotor stage of a gas turbine engine can be subject to damage caused by a variety of different factors. For example, foreign objects can strike a fan blade ("FOD" damage), or surface erosion can occur, or vibratory response can produce high cycle fatigue that can lead to damage, to name a few. Such damage may be randomly located (e.g., when caused by FOD) or it may be statistically more likely located in certain regions; e.g., along the leading edge of a fan blade, and more specifically at certain regions of a fan blade leading edge.

Current practices for inspecting fan blades involve a manual inspection of each fan blade by a technician when the turbine engine is shut down. Inspections of this type are time intensive, costly, and require skilled technicians.

There is a need for a more efficient and less costly process that can be used to inspect fan blades.

SUMMARY

An inspection system for rotating fan rotor blades in a fan rotor stage of a gas turbine engine. The fan rotor stage has a rotational axis and the gas turbine engine has a sensor configured to provide a signal representative of a rotational speed of the fan rotor stage. The system includes a plurality of cameras, a plurality of light sources, and a system controller. The cameras are controllable to capture an image of a leading edge of a fan rotor blade and produce signals representative of the captured image. Each light source is associated with a respective camera. Each respective camera and each respective light source is mounted with a static structure disposed forward of the fan rotor blade stage. The system controller is in communication with the cameras, the light sources, and a non-transitory memory storing instructions. The instructions when executed cause the system controller to: monitor the rotational speed of the fan rotor stage during a shutdown of the gas turbine engine; upon the rotational speed of the fan rotor stage reaching a first predetermined value, control the light sources to selectively illuminate at least portions of the fan rotor blades, and control the cameras to capture images of the leading edge of respective fan rotor blades and produce signals representative of the captured images; and provide inspection information representative of the leading edge of respective fan rotor blades using the signals representative of the captured images.

In any of the aspects or embodiments described above and herein, the cameras may be disposed at a single circumferential position or at a plurality of different circumferential positions.

In any of the aspects or embodiments described above and herein, the first predetermined rotational speed value may be an idle speed.

In any of the aspects or embodiments described above and herein, the instructions when executed may cause the system controller to control the light sources to selectively illuminate at least portions of the fan rotor blades and control the cameras to capture images of the leading edge of respective fan rotor blades and produce signals representative of the captured images until the rotational speed of the fan rotor stage reaches a second predetermined rotational speed value.

In any of the aspects or embodiments described above and herein, the second predetermined rotational speed value may be zero RPMs.

In any of the aspects or embodiments described above and herein, the second predetermined rotational speed value may be greater than zero RPMs and less than the idle speed.

In any of the aspects or embodiments described above and herein, the instructions when executed may cause the system controller to control the light sources to selectively illuminate at least portions of the fan rotor blades and control the cameras to capture images of the leading edge of respective fan rotor blades and produce signals representative of the captured images for a period of time sufficient to get an adequate number of images for analysis purposes.

In any of the aspects or embodiments described above and herein, the period of time sufficient to get an adequate number of images for analysis purposes may be a predetermined value based on empirical data.

According to an aspect of the present disclosure, a method of inspecting rotating fan rotor blades in a fan rotor stage of a gas turbine engine is provided. The fan rotor stage has a rotational axis. The method includes determining a rotational speed of the fan rotor stage; during a shutdown period of the gas turbine engine, controlling a plurality of cameras to capture images of fan rotor blade leading edges and produce signals representative of the captured images once the fan rotor stage has reached a first predetermined fan rotor stage rotational value; controlling a plurality of light sources to illuminate the fan rotor blade leading edges during the imaging, wherein each respective camera of the plurality of cameras and each respective said light source is mounted with a static structure disposed forward of the fan rotor blade stage; and determining inspection information representative of the fan rotor blade leading edges using the signals representative of the captured images.

In any of the aspects or embodiments described above and herein, the step of controlling the light sources to selectively illuminate at least portions of the fan rotor blades and the step of controlling the cameras to capture images of the leading edge of respective fan rotor blades and produce signals representative of the captured images may be performed until the rotational speed of the fan rotor stage reaches a second predetermined rotational speed value.

In any of the aspects or embodiments described above and herein, the step of controlling the light sources to selectively illuminate at least portions of the fan rotor blades and the step of controlling the cameras to capture images of the leading edge of respective fan rotor blades and produce signals representative of the captured images may be performed for a period of time sufficient to get an adequate number of images for analysis purposes.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however,

DETAILED DESCRIPTION

Figure 1:
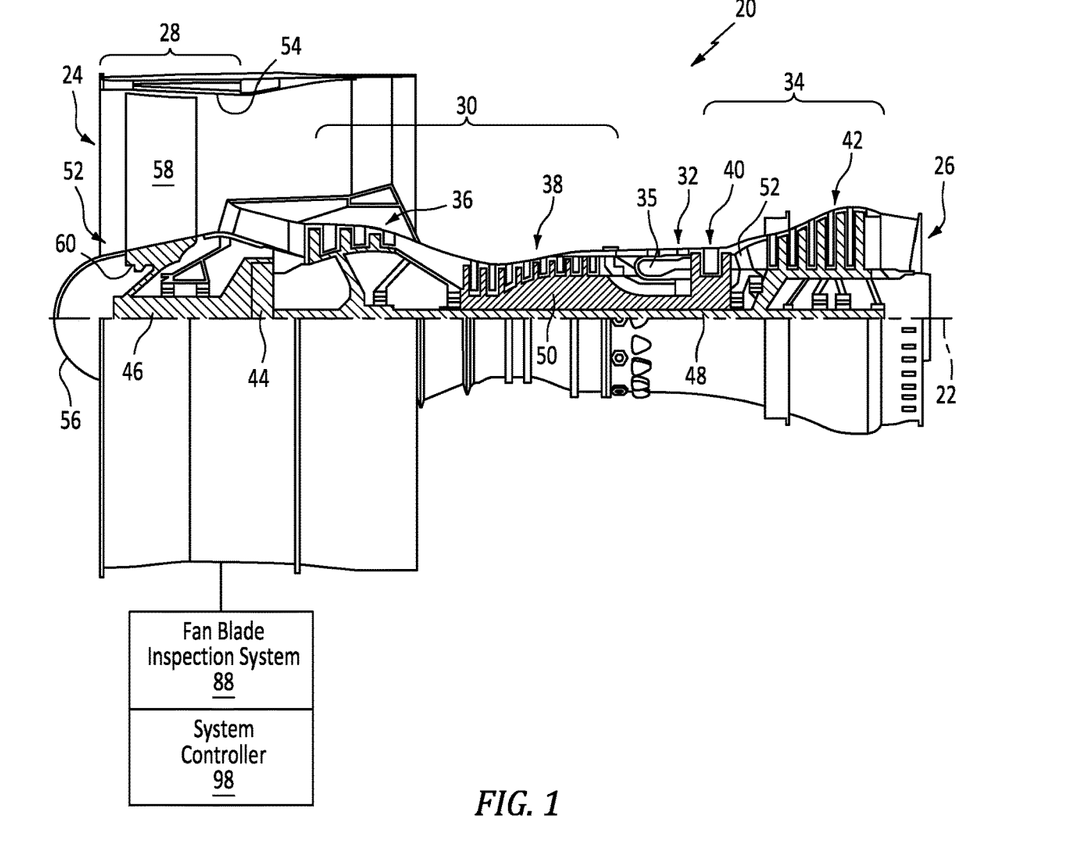
FIG. 1 is a diagrammatic partially sectioned view of a gas turbine engine.

FIG. 1 shows a partially sectioned diagrammatic view of a geared gas turbine engine 20. The gas turbine engine 20 extends along an axial centerline 22 between an upstream airflow inlet 24 and a downstream airflow exhaust 26. The gas turbine engine 20 includes a fan section 28, a compressor section 30, a combustor section 32, and a turbine section 34. The combustor section 32 includes a combustor 35. The compressor section includes a low-pressure compressor (LPC) 36 and a high-pressure compressor (HPC) 38. The turbine section 34 includes a high-pressure turbine (HPT) 40 and a low-pressure turbine (LPT) 42. The engine sections are arranged sequentially along the centerline 22 within an engine housing. The fan section 28 is connected to a geared architecture 44, for example, through a fan shaft 46. The geared architecture 44 and the LPC 36 are connected to and driven by the LPT 42 through a low-speed shaft 48. The HPC 38 is connected to and driven by the HPT 40 through a high-speed shaft 50. The terms "forward", "leading", "aft, "trailing" are used herein to indicate the relative position of a component or surface. As core gas air passes through the engine 20, a "leading edge" of a stator vane or rotor blade encounters core gas air before the "trailing edge" of the same. In a conventional axial engine such as that shown in FIG. 1, the fan section is "forward" of the compressor section and the turbine section is "aft" of the compressor section. The terms "inner radial" and "outer radial" refer to relative radial positions from the engine centerline. An inner radial component or path is disposed radially closer to the engine centerline 22 than an outer radial component or path. The gas turbine engine 20 diagrammatically shown is an example provided to facilitate the description herein. The present disclosure is not limited to any particular gas turbine engine configuration, including the two-spool engine configuration shown, and may be utilized with single spool gas turbine engines as well as three spool gas turbine engines and the like.

Figure 2:
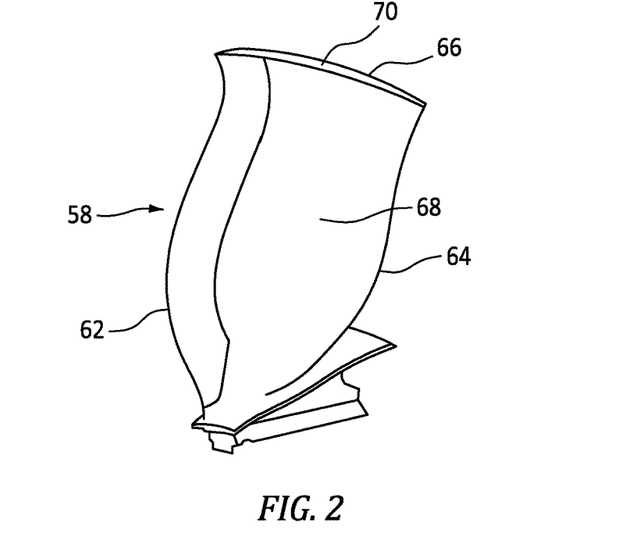
FIG. 2 is a diagrammatic perspective view of a fan rotor blade.

The fan section 28 includes a fan rotor stage 52, a fan outer casing 54, and a nose cone 56. The fan rotor stage 52 includes a plurality of fan blades 58 extending radially outwardly from a hub 60. Each fan blade 58 (e.g., see FIG. 2) includes an airfoil having a leading edge 62, a trailing edge 64, a suction side 66, a pressure side 68, and a blade tip 70. The fan blades 58 are spaced apart from one another circumferentially around the rotor hub 60. The fan outer casing 54 is disposed radially outside of the blade tip 70. The nose cone 56 is body that extends axially out from the fan rotor stage hub 60, in a forward direction. The nose cone 56 is disposed forward of the fan rotor stage 52.

Figure 3:
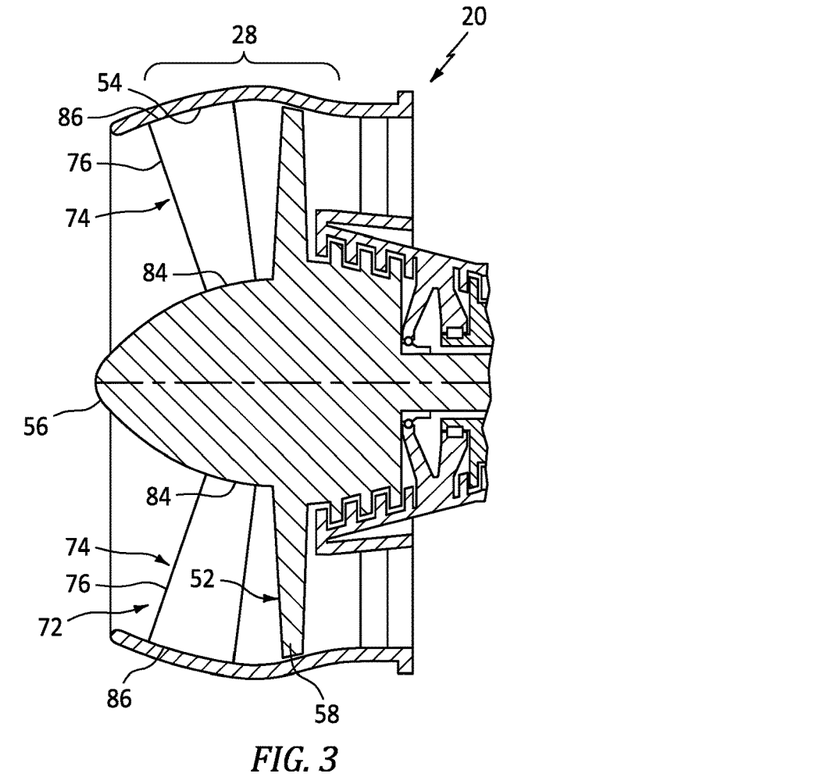
FIG. 3 is a diagrammatic partially sectioned view of a gas turbine engine portion.
Figure 4:
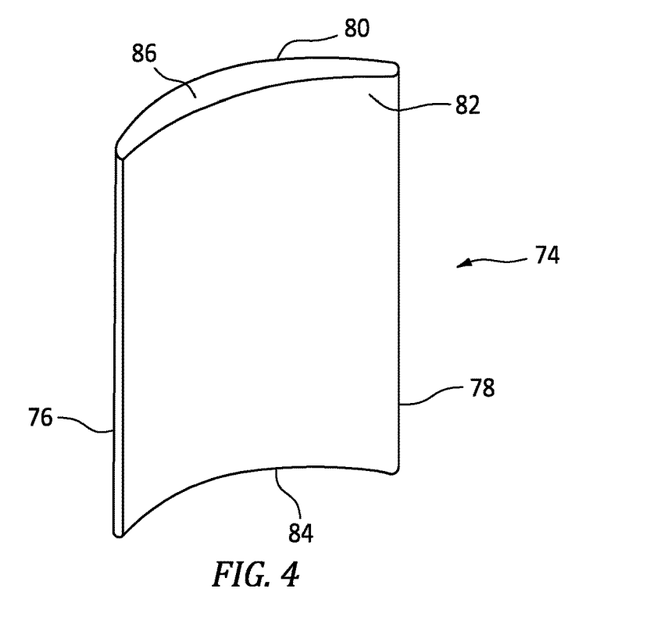
FIG. 4 is a diagrammatic perspective view of a stator vane.

The gas turbine engine 20 diagrammatically shown FIG. 1 diagrammatically illustrates a fan section 28 that does not include a fan inlet guide vane stage. FIG. 3 diagrammatically illustrates a gas turbine engine 20 with a fan section 28 that includes a fan inlet guide vane stage 72. The fan inlet guide vane stage 72 includes a plurality of inlet guide vanes 74 (see FIG. 4) that extend radially between an inner static structure to an outer static structure (e.g., fan outer casing 54). Each guide vane 74 includes an airfoil having a leading edge 76, a trailing edge 78, a suction side 80, a pressure side 82, an inner radial end 84, and an outer radial end 86. Static inlet guide vanes 74 may include an inner platform (not shown) that defines the inner flow boundary and an outer platform (not shown) that defines the outer flow boundary. Variable inlet guide vanes do not have inner and outer platforms and may be described as having an inner radial end surface and an outer radial end surface. The fan inlet guide vanes 74 are spaced apart from one another circumferentially.

Figure 5:
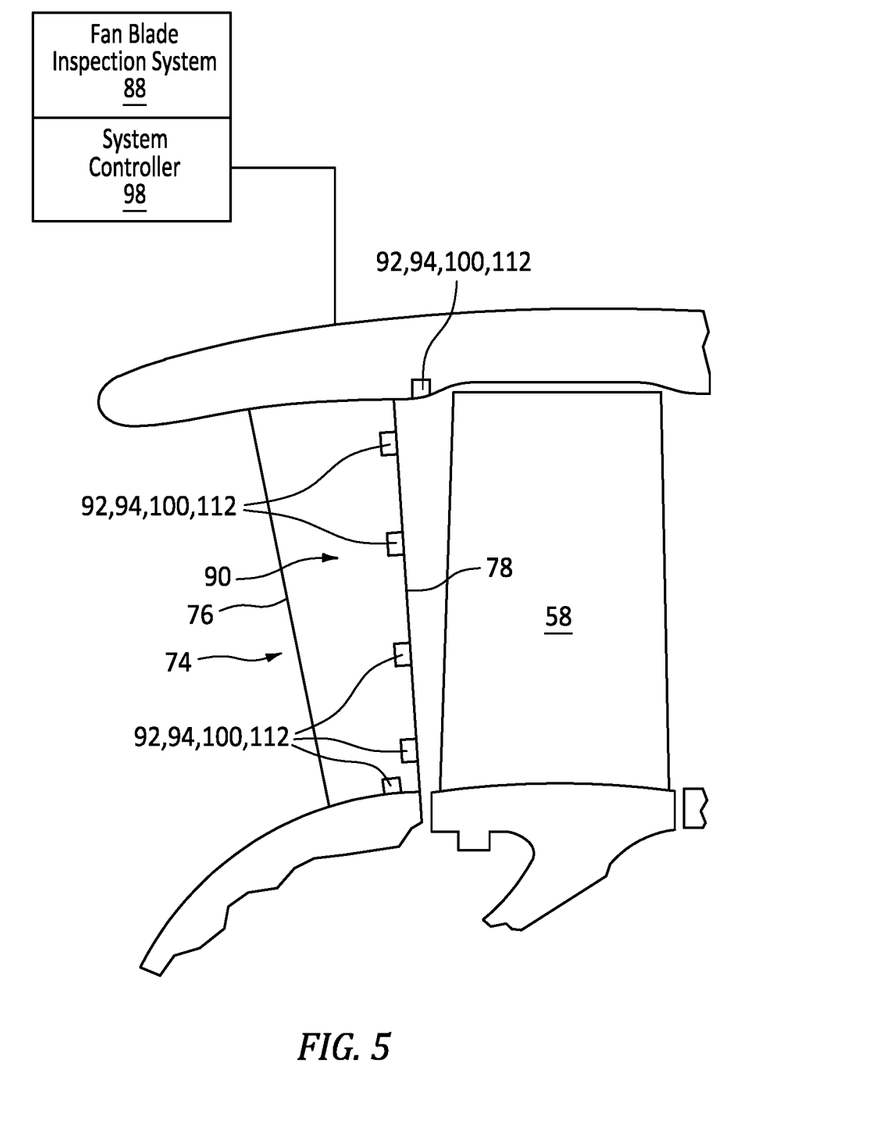
FIG. 5 is a diagrammatic representation of a present disclosure blade inspection system.

Aspects of the present disclosure are directed to a fan blade inspection system 88. The inspection system 88 includes a blade imaging system 90, a light source 92, and a cleaning system 94. In some embodiments, the inspection system 88 may also include an enclosure (i.e., a housing 96) for the blade imaging system 90. The inspection system 88 may include a system controller 98, or maybe in communication with a controller present within the aircraft; e.g., a FADEC.

The blade imaging system 90 is configured to produce images of a portion or all of a fan blade 58. The imaging system 90 includes one or more imaging devices 100 configured to capture a digital image of the fan blade 58 and produce signals representative of the captured image. A non-limiting example of such a device is a digital camera. To facilitate the description herein the imaging device will be referred to as a "camera 100". Unless stated otherwise herein, the present disclosure is not limited to any particular type of camera other than one that is capable of performing the functions described herein. A camera 100 may be used in the present disclosure to directly capture an image, or to indirectly capture an image. An example of "indirectly" capturing of an image may be one in which the light energy captured by the camera 100 passes through, or encounters, one or more optical components (e.g., a lens, a filter, a light pipe, a fiber optic, a mirror, or the like) prior to reaching the camera 100.

A camera 100 used in the present disclosure has parameters (e.g., resolution, field of view, shutter speed, exposure time, and the like) that enable the camera 100 to capture images of a moving (i.e., rotating) fan blade 58 acceptable for inspection purposes. The field of view for a particular camera 100 may be selected based on the desired resolution and the geometry of the fan blade 58 to be imaged. Cameras 100 used in the present disclosure may be configured to have a focus distance based on the position of the camera 100 relative to the fan blade 58 to be imaged. The present disclosure is not limited to any particular camera 100 other than one acceptable to perform the functions described herein.

The light source 92 is configured to provide an amount of light adequate for the camera 100 to capture images of a fan blade 58. For example, the light source 92 may be configured to illuminate a portion of a fan blade 58 sufficiently for an image to be captured. The light source 92 may be integral with the camera 100 or it may be independent of the camera 100. Consequently, the light source 92 may be located with the camera 100, or proximate the camera 100, or it may be remote from the camera 100. The light source 92 may include a single light source 92 or a plurality of independent light sources. The light source 92 may be controllable to produce light in a flash mode (including a strobe mode) or in a sustained-on mode. A light emitting diode (LED) is a non-limiting example of a light source 92 that may be used.

Figure 6:
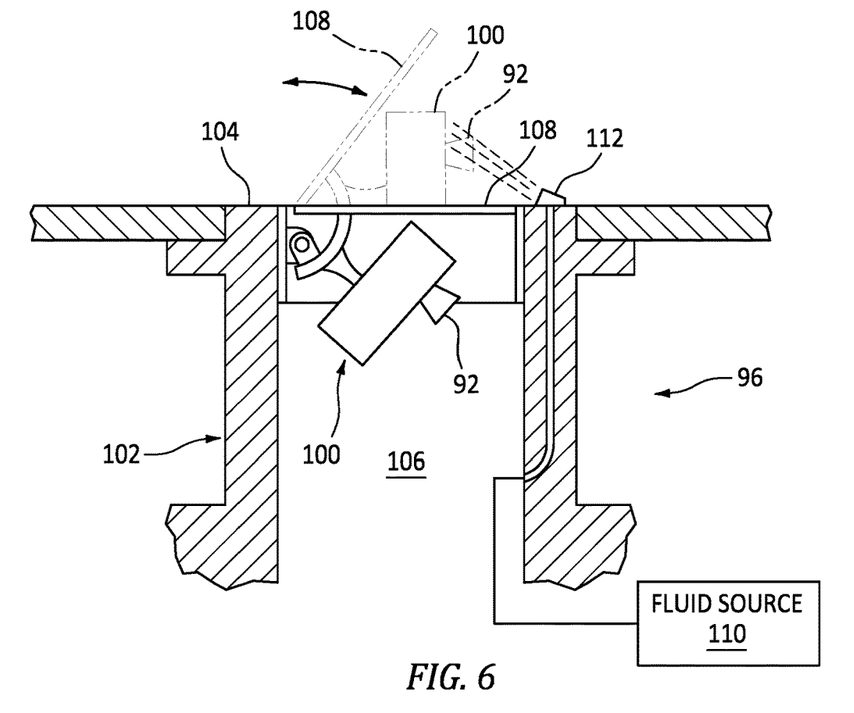
FIG. 6 is a diagrammatic representation of present disclosure inspection system components.

In some present disclosure embodiments, a system camera 100 and/or light source 92 may be mounted directly in or on an engine component (e.g., in a vane 74, or in a casing 54, in a boroscope hole, or the like) or it may be mounted in a housing 96 that is, in turn, mounted in or attached to an engine component. The term "engine component" as used herein is intended to include vanes, casings or liners, the latter of which may sometimes be considered a part of the engine nacelle. FIG. 6 diagrammatically illustrates a non-limiting example of a housing 96 that may be used to partially, or fully, enclose a camera 100 (and may also enclose a light source 92). The housing 96 may include one or more outer walls 102 and a top panel 104. An interior compartment 106 of the housing 96 may be defined by the outer walls 102 and the top panel 104. In some embodiments, a housing 96 may include a base panel extending between the outer walls 102. In some embodiments, the top panel 104 may be fixed (i.e., the top panel 104 is not removed during imaging) and includes an optically transparent portion that permits a camera 100 enclosed in the interior compartment 106 of the housing 96 to capture images through the transparent portion.

In some embodiments, the top panel 104 may include a lid 108 that may be selectively positioned in a closed position and one or more open positions; e.g., a partially open position or a fully open position. In the closed position, one or more cameras 100 are enclosed in the interior compartment 106 of the housing 96. In an open position, one or more cameras 100 are no longer completely enclosed in the housing 96 and have a field of view of the fan blades 58. In the embodiment shown in FIG. 6, for example, the housing 96 includes a lid 108 that is pivotally attached to the housing 96 and may be pivoted between a closed position (as shown) and an open position (shown in phantom). In some embodiments, the entire top panel may function as an actuable lid 108.

Figure 7:
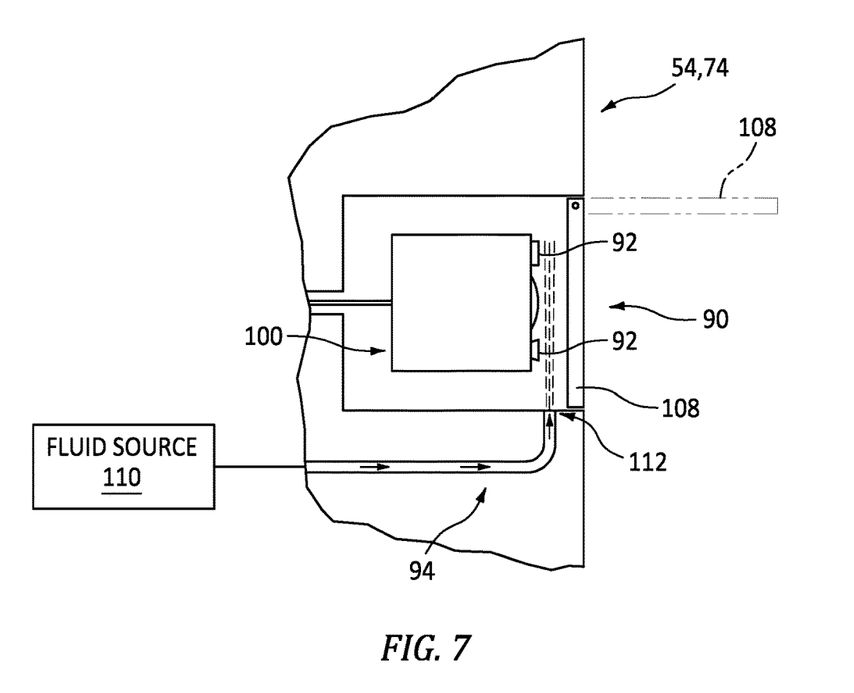
FIG. 7 is a diagrammatic representation of a present disclosure blade inspection system.

FIG. 7 diagrammatically illustrates a system camera 100 and light source 92 mounted directly in an engine component (e.g., a vane, a casing, a boroscope hole, or the like). This embodiment example includes a lid 108 that may be selectively positioned in a closed position and an open position, and a cleaning system 94 embodiment.

In some embodiments, the housing 96 may be configured to mount a camera 100 (or more than one camera 100) in a fixed position in the housing 96. In other embodiments, a housing 96 may be configured to selectively translate (i.e., linear translation, rotational translation, or any combination thereof) the camera(s) 100. In the embodiment shown in FIG. 6, for example, the housing 96 is configured such that when the lid 108 is rotated to the open position, at least a portion of the camera 100 is translated from the interior compartment 106 of the housing 96 to an exposed position. Conversely when the lid 108 is rotated to the closed position, the camera 100 is translated in the opposite direction and back into the interior compartment 106 of the housing 96. Movement of the lid 108 between the open and closed positions may be accomplished by an actuator (e.g., electric, hydraulic, pneumatic). The pivotable lid 108 shown in FIG. 6 is a non-limiting example of a lid 108. Alternative lids 108 may be differently configured; e.g., the lid 108 may pivot to a position internal to the housing 96 (and thereby not enter the gas path), or may be configured to translate linearly (e.g., a sliding lid, or a tracked lid, or the like). The present disclosure is not limited to any particular lid 108 or lid actuation configuration.

The cleaning system 94 is configured to provide a fluid flow relative to the camera 100 or a surface (e.g., a surface of an optically transparent panel through which images are captured) to prevent debris (e.g., dust, dirt, water, ice, or the like) from collecting on the camera 100/surface, or to remove debris that is present on the camera 100/surface, or to inhibit debris from striking the camera 100, or any combination thereof. The fluid used by the cleaning system 94 to prevent/remove debris may be air or a liquid; e.g., a cleaning solution. The cleaning system 94 may be in fluid communication with a fluid source 110. A non-limiting example of a fluid source 110 is pressurized gas leaked from, or bled off of, an engine component; e.g., compressor leakage air, compressor bleed air, or the like. Another example of a fluid source 110 is a dedicated component (e.g., a compressor, a fan, a liquid pump, or the like) configured to provide a fluid flow adequate for cleaning purposes. In some embodiments, the cleaning system 94 may include one or more features (e.g., diverter surfaces, a quasi-venturi structure, or the like) that collect air that would otherwise pass by the camera 100 into a form capable performing the cleaning described herein. In these examples, an independent fluid source 110 may not be required. The fluid flow may be configured in any way that is capable of preventing debris collection, removing collected debris, or preventing debris impact or the like; e.g., a defined stream/jet, a film, a spray, or the like. The cleaning system 94 may include one or more nozzles 112 configured to produce and direct the fluid flow in a manner that facilitates cleaning the camera 100/surface. For example, the cleaning system 94 may include one or more nozzles 112 configured to produce a fluid jet directed toward the camera 100/surface. The fluid directed toward the camera 100/surface may be oriented to impinge on the camera 100/surface or may be oriented to pass over (e.g., substantially perpendicular to the field of view of the camera 100) the camera 100/surface. As another example, the cleaning system 94 may include a distribution head that configures the fluid flow as a film that passes over the camera 100/surface. These are examples of how the cleaning fluid flow may be configured to clean the camera 100/surface and the present disclosure is not limited thereto.

In those inspection system 88 embodiments that include a system controller 98, the controller 98 is in communication with other system components, such as the blade imaging system 90, the light source 92, the cleaning system 94, and one or more controllers associated with the aircraft; e.g., the FADEC. The system controller 98 may be in communication with these components to control and/or receive signals therefrom to perform the functions described herein. The system controller 98 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system to accomplish the same algorithmically and/or coordination of system components. The system controller 98 includes or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. The system controller 98 may include, or may be in communication with, an input device that enables a user to enter data and/or instructions, and may include, or be in communication with, an output device. Communications between the system controller 98 and other system components may be via a hardwire connection or via a wireless connection.

The present disclosure blade inspection system 88 may be implemented in a variety of different ways. In some instances, a present disclosure inspection system 88 may include cameras 100 oriented to produce image data for the entirety of the fan blade leading edge 62; e.g., a fan blade leading edge 62 imaged by a single camera 100, or a leading edge 62 may be collectively imaged using image data from a plurality of cameras 100 directed to different regions of a leading edge 62. Alternatively, cameras 100 may be oriented to produce image data only for particular portions of a fan blade leading edge 62 and the entire leading edge 62 is not imaged. In some embodiments, the system 88 may utilize more than one camera 100 to image the same portion of a fan blade 58; e.g., each camera 100 at a different point of view/orientation.

As indicated above, fan blade damage can be caused by a variety of different factors and the location of that damage may be random or may occur in regions with a higher probability of damage. Embodiments of the present disclosure inspection system 88 address both of these possibilities by providing an inspection system 88 that can image the entire leading edge 62 of a fan blade 58, or image only those regions with a higher probability of damage.

Figure 8:
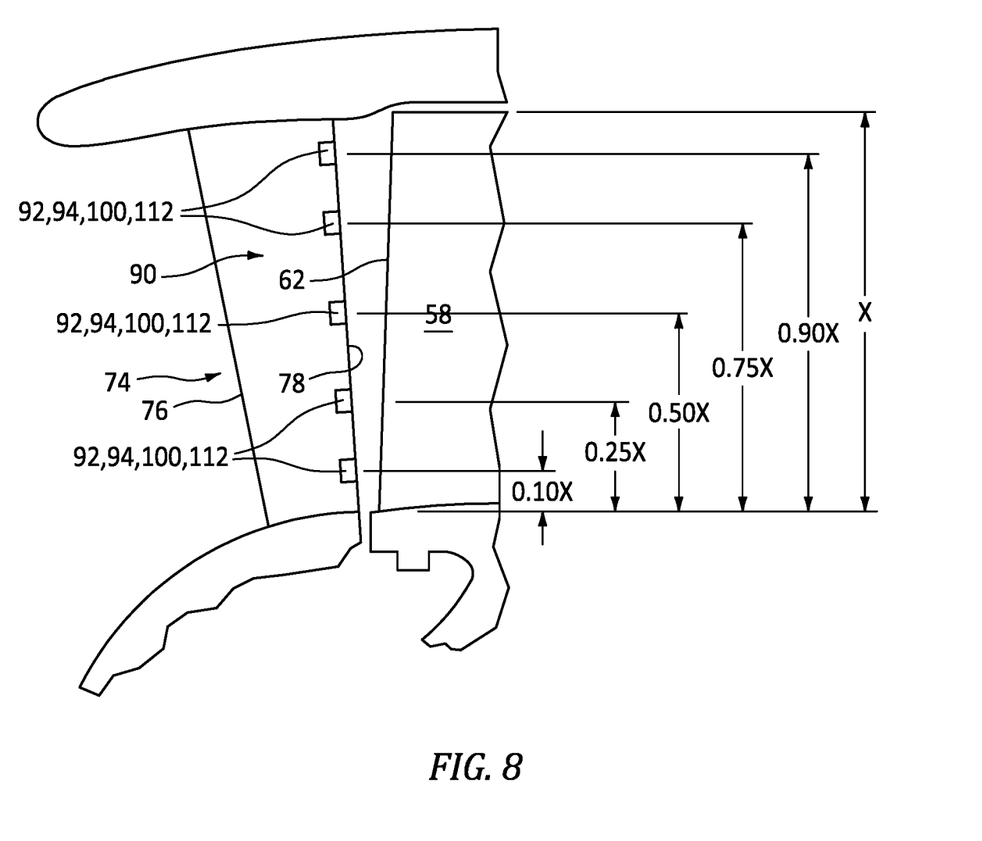
FIG. 8 is a diagrammatic representation of a present disclosure blade inspection system.

The cameras 100, light sources 92, and cleaning system 94 of the present disclosure inspection system may be located in a variety of different positions. For example, FIG. 8 diagrammatically illustrates a plurality of cameras 100 mounted proximate the trailing edge 78 of a guide vane 74. As detailed herein, each camera 100 may be mounted internally in the vane 74 or attached to an external surface of the vane 74, with or without a housing 96. The number of cameras 100 may be chosen based on the field of view of each camera 100 so the entirety of the leading edge 62 of a fan blade 58 rotating past the vane 74 can be collectively imaged. The camera 100 arrangement shown in FIG. 8 illustrates the cameras 100 disposed at a single guide vane 74 (therefore at a single circumferential position) at different radial locations at that circumferential position; e.g., where the radial distance between inner and outer radial boundaries of the fan section gas path is equal to "X", a first camera 100 is located at "10% X" (i.e., proximate the inner radial boundary), a second camera 100 is located at "25% X", a third camera 100 is located at "50% X", a fourth camera 100 is located at "75% X", and a fifth camera 100 is located at "90% X" (i.e., proximate the outer radial boundary). The radial arrangement of cameras 100 shown in FIG. 8 is provided for illustration purposes and the present disclosure is not limited thereto. In some embodiments, cameras 100 may be disposed at a plurality of different circumferential positions; e.g., a first set of cameras 100 disposed in a first guide vane 74 located at top dead center (TDC—or the 0 degree position), and a second set of cameras 100 disposed in a second guide vane 74 at bottom dead center (BDC or the 180 degree position), and the like. In these embodiments, the cameras 100 in each set may be arranged in similar radial positions; e.g., as described above. In some embodiments, cameras 100 may be disposed at a plurality of different circumferential positions, each at a different radial position; e.g., a first camera 100 at a first radial position (0.25*X), and a first circumferential position (TDC), a second camera 100 at a second radial position (0.50*X) and a second circumferential position (120 degrees from TDC), a third camera 100 at a third radial position (0.75*X) and a third circumferential position (240 degrees from TDC), and so on. Varying the circumferential positioning of cameras 100 may facilitate imaging multiple fan blades 58 in a decreased period of time. In some embodiments, the field of view of the respective cameras 100 may overlap to some degree to ensure information is produced along the entirety of the leading edge 62 of a fan blade 58.

The cameras 100 and light sources 92 of the present disclosure inspection system 88 may be oriented to produce images of the same portion of a fan blade 58 in more than one orientation relative to the fan blades 58. For example, cameras 100 may be positioned to capture leading edge 62 images from an orientation skewed towards the suction side of a fan blade 58 or positioned to capture leading edge 62 images from an orientation skewed towards the pressure side of the fan blade 58, or positioned to capture leading edge 62 images from a direction normal to the leading edge 62 of the fan blade 58, and the like. A plurality of cameras 100 may be disposed to image a fan blade 58 at a particular radial position, with each camera 100 having a different orientation, to facilitate acquiring a more complete collective image of the leading edge 62 at that radial position. In those embodiments wherein cameras 100 are positioned at different circumferential positions, embodiments of the present disclosure may include a first camera 100 at a first radial position and first orientation, a second camera 100 at a second radial position and second orientation, and so on. Here again, the multiple orientations may facilitate acquiring a more complete collective image of a leading edge 62. The imaging system 90 may include cameras 100 disposed at any combination of radial positions, circumferential positions, orientations, and any combination thereof.

The light sources 92 are oriented to illuminate the field of view of the cameras 100. As detailed herein, the light sources 92 may be mounted proximate the cameras 100 internally in the vane 74 or attached to an external surface of the vane 74, or may be mounted remote from the cameras 100. In those embodiments that utilize a camera housing 96, the light source 92 may be mounted in the housing 96. A light source 92 may be mounted with each camera 100, including with the cameras 100 mounted in the inner and outer casings.

The cleaning system 94 may be configured to provide a fluid flow relative to all of the cameras 100, or only those cameras 100 that will likely be subjected to debris accumulation. In the example inspection systems shown in FIGS. 5 and 8 that include cameras 100 disposed proximate the trailing edge 78 of a guide vane 74, the cleaning system 94 may include one or more cleaning fluid nozzles 112 disposed proximate each camera 100 (e.g., see FIGS. 6 and 7), oriented to pass a stream of air over the lens of the camera 100 (or over a transparent member covering the camera). The cleaning system nozzles 112 may be disposed in the vane 74 directly or may be incorporated into the housing 96 containing the camera 100, or the like. The present disclosure is not limited to any particular cleaning system nozzle 112 mounting arrangement. FIGS. 6 and 7 diagrammatically illustrate nozzles 112 configured to produce a directed stream of air over the camera 100 when the camera 100 is exposed to image a fan blade 58 (e.g., shown in phantom). FIGS. 6 and 7 diagrammatically illustrate a single nozzle 112 but more than one nozzle 112 may be utilized. The cleaning system 94 may be configured such that the cleaning fluid flow is only produced when the camera 100 is in, or is about to be in, operation. Alternatively, the cleaning system 94 may be configured such that the cleaning fluid flow is produced only during periods of time when the camera 100 is operating. This mode of operation may be useful for those camera 100 configurations wherein the camera 100 is exposed during imaging and stored when not imaging. Alternatively, in some embodiments the cleaning system 94 may be used in an operational mode wherein a cleaning fluid flow is provided both when the camera 100 is operating and when it is not operating; e.g., to prevent a build-up of debris. This mode of operation may be useful for those camera 100 configurations wherein the camera 100 is stationary and is covered by a transparent member. In some cleaning system 94 embodiments, a cleaning fluid flow may be provided on a "need" basis; e.g., if a camera 100 produces an image that indicates the presence of debris, the cleaning system 94 can be controlled to produce a cleaning fluid flow for that camera 100.

An example of present disclosure fan blade inspection system 88 operation is provided hereinafter in the context of an aircraft that has landed and has taxied to a final position. During the taxiing, the engine 20 provides motive force for the aircraft and the fan blades 58 of the fan stage rotate at a first rotational speed ("First N1"). Once the aircraft has arrived at its final position, the engine 20 is shutdown. During shutdown, the rotational speed of the fan blades 58 will decrease from the earlier rotational speed (i.e., First N1) and will continue to decrease until the fan blades 58 are stationary. During that period of decreasing rotational speed, the rotational speed of the fan blades 58 will transition through a predetermined rotational speed; e.g., an idle speed (Idle N1; e.g., about 20% of rotational speed at maximum thrust). Upon reaching the predetermined rotational speed, the present disclosure blade inspection system 88 may be activated; e.g., fan rotational speed sensors may communicate the fan speed to the system controller 98 and upon reaching the predetermined fan rotational speed (e.g., Idle N1), the inspection system 88 is activated. Upon activation, the imaging system 90 is controlled to acquire images of the leading edges 62 of fan blades 58 rotating past the system cameras 100. The imaging system 90 may be controlled to acquire images of the leading edges 62 of fan blades 58 until a second predetermined fan rotor stage rotational speed is reached. The second predetermined fan rotor stage rotational speed may be zero (N1=0; the fan rotor stage 52 is at rest), or it may be a value between zero RPMs and the idle speed. Alternatively, the imaging system 90 may be controlled to acquire images of the leading edges of fan blades 58 until a period of time sufficient to get an adequate number of images for analysis purposes has passed (which period of time can be determined based on empirical data). At the same time, the light source 92 and the cleaning system 94 are activated to produce light at the appropriate times, and to produce cleaning fluid flows at the appropriate times. In those embodiments where a camera 100 is mounted in a housing 96 with a lid 108, prior to images being acquired and the lighting source 92 and cleaning system 94 being activated, the lids 108 are activated to translate from a closed position to an open position. When a housing 96 is used that translates the camera 100 from in the housing 96 to an exposed operating position, the camera 100 may be translated at the same time as the lid 108 is actuated. During the translation and/or after the camera 100 has reached its operating position, the cleaning system 94 may produce one or more fluid flows in a direction intended to remove any debris that may be present in the light path of the camera 100 (i.e., on the camera 100 lens). In those embodiments where a camera 100 is fixed in an engine component or a housing 96 (and for example covered with a transparent member), prior to images being acquired, the cleaning system 94 may be operated to produce one or more fluid flows in a direction intended to remove any debris that may be present in the light path of the camera 100 (e.g., on the transparent member). Hence, the cleaning system 94 may be controlled to operate before and/or during imaging, or periodically during imaging, or continuously during imaging. In those configurations wherein the cleaning system 94 is operated periodically or continuously during imaging, the present disclosure inspection system may be configured to terminate the cleaning process, for example, based on the rotational speed of the fan blades 58 (e.g., when N1=0), or after a period of time sufficient to get an adequate number of images for analysis purposes, or the like. The captured fan blade 58 images may be stored for later access or may be communicated to a remote device (e.g., the FADEC), or the like, or any combination thereof.

The above example of the present disclosure inspection system 88 in operation is provided to illustrate how the inspection system may be operated and is not intended to be limiting. This example illustrates well how the inspection system 88 operation may be integrated seamlessly into normal engine operation without the need to perform special steps for inspection purposes. This example also illustrates how fan blade inspection data may be acquired after every flight, and therefore before a subsequent flight. If the inspection reveals a potential fan blade 58 issue, the collected image data can be used to flag the need for additional inspection and/or other action before the engine is operated again.

Because the blade imaging system 90 of the present disclosure is imaging rotating fan blades 58 and because the rotational speed of those fan blades 58 may vary during an inspection period (e.g., from Idle-N1 to Zero-N1), embodiments of the present disclosure may control the imaging as a function of the rotational speed of the fan blades 58. In some embodiments, camera 100 operation may be synchronized as a function of fan blade 58 rotational speed. For example, the cameras 100 may be controlled to operate at a frequency that coincides with the passage of every Nth blade 58, where "N" is an integer. In this manner, over a period of time the system may be controlled to capture images of every fan blade 58 in the fan rotor blade stage 52 over a period of time albeit not every blade 58 during every complete rotation of the fan blade rotor stage 52. As the rotational speed of the fan rotor blades 58 decreases, camera activation frequency may be adjusted to maintain the synchronization between the cameras 100 and the rotating blades 58.

The present disclosure inspection system may include stored instructions that are capable of processing the image signals received from the cameras 100. An advantage of the present disclosure inspection system is that a significant number of blade 58 images can be captured to facilitate the analysis process. The image processing may involve accounting for blurring that may occur as a result of the rotating fan blades 58, or accounting for lighting conditions, or accounting for debris that may be present on the fan blades 58, or the like, or any combination thereof. The image processing may use artificial intelligence techniques or comparative analytics wherein images are comparatively analyzed relative to stored images or to blade computer models, or the like, or any combination thereof. The comparative analytics may include analysis of blades over an operationally significant period of time; e.g., to evaluate changes in the blades that may occur over the period of time. Blade wear may not be apparent at a given point of time but may be recognizable based on changes over a longer period of time. Furthermore, the image data may be analyzed for preventative maintenance and/or maintenance scheduling purposes; e.g., data that can be used to determine a predicted end-of-useful life for a given rotor blade 58.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. An inspection system for rotating fan rotor blades in a fan rotor stage of a gas turbine engine configured to power an aircraft, the fan rotor stage having a rotational axis, the gas turbine engine having a sensor configured to provide a signal representative of a rotational speed of the fan rotor stage, the system comprising:
   a plurality of cameras, each controllable to capture an image of a leading edge of a fan rotor blade and produce signals representative of the captured image;
   a plurality of light sources, each said light source associated with a respective camera;
   wherein each respective camera of the plurality of cameras and each respective said light source is statically mounted with a static structure disposed forward of the fan rotor blade stage;
   a system controller in communication with the plurality of cameras, the plurality of light sources, and a non-transitory memory storing instructions, wherein said instructions when executed cause the system controller to:
      monitor the rotational speed of the fan rotor stage during a shutdown of the gas turbine engine configured to power an aircraft;
      upon the rotational speed of the fan rotor stage decreasing to a first predetermined value during the shutdown, control the plurality of light sources to selectively illuminate at least portions of the fan rotor blades, and control the plurality of cameras to capture images of the leading edge of respective fan rotor blades and produce signals representative of the captured images; and provide inspection information representative of the leading edge of respective fan rotor blades using the signals representative of the captured images.

2. The inspection system of claim 1, wherein the plurality of cameras are disposed at a single circumferential position with the static structure.

3. The inspection system of claim 1, wherein the plurality of cameras are disposed at a plurality of different circumferential positions with the static structure.

4. The inspection system of claim 1, wherein the first predetermined rotational speed value is an idle speed.

5. The inspection system of claim 4, wherein the instructions when executed cause the system controller to control the plurality of light sources to selectively illuminate at least portions of the fan rotor blades and control the plurality of cameras to capture images of the leading edge of respective fan rotor blades and produce signals representative of the captured images until the rotational speed of the fan rotor stage decreases to a second predetermined rotational speed value.

6. The inspection system of claim 5, wherein the second predetermined rotational speed value is zero RPMs.

7. The inspection system of claim 5, wherein the second predetermined rotational speed value is greater than zero RPMs and less than the idle speed.

8. The inspection system of claim 4, wherein the instructions when executed cause the system controller to control the plurality of light sources to selectively illuminate at least portions of the fan rotor blades and control the plurality of cameras to capture images of the leading edge of respective fan rotor blades and produce signals representative of the captured images for a period of time sufficient to get an adequate number of images for analysis purposes.

9. The inspection system of claim 8, wherein the period of time sufficient to get an adequate number of images for analysis purposes is a predetermined value based on empirical data.

10. A method of inspecting fan rotor blades, comprising:
initiating a shutdown period of a gas turbine engine powering an aircraft after a flight of the aircraft, the gas turbine engine having a fan rotor stage that includes a plurality of fan rotor blades, wherein during the shutdown period, the fan rotor stage decreases in rotational speed;
during the shutdown period of the gas turbine engine, controlling a plurality of cameras to capture images of fan rotor blade leading edges and produce signals representative of the captured images once the fan rotor stage has decreased to a first predetermined fan rotor stage rotational speed value;
controlling a plurality of light sources to illuminate the fan rotor blade leading edges during the imaging;
wherein each respective camera of the plurality of cameras and each respective said light source is statically mounted with a static structure disposed forward of the fan rotor blade stage; and
determining inspection information representative of the fan rotor blade leading edges using the signals representative of the captured images.

11. The method of claim 10, wherein the first predetermined rotational speed value is an idle speed.

12. The method of claim 11, wherein the step of controlling the plurality of light sources to selectively illuminate at least portions of the fan rotor blades and the step of controlling the plurality of cameras to capture images of the leading edge of respective fan rotor blades and produce signals representative of the captured images are performed until a rotational speed of the fan rotor stage reaches a second predetermined rotational speed value.

13. The method of claim 12, wherein the second predetermined rotational speed value is zero RPMs.

14. The method of claim 12, wherein the second predetermined rotational speed value is greater than zero RPMs and less than the idle speed.

15. The method of claim 11, wherein the step of controlling the plurality of light sources to selectively illuminate at least portions of the fan rotor blades and the step of controlling the plurality of cameras to capture images of the leading edge of respective fan rotor blades and produce signals representative of the captured images are performed for a period of time sufficient to get an adequate number of images for analysis purposes.

16. The method of claim 15, wherein the period of time sufficient to get an adequate number of images for analysis purposes is a predetermined value based on empirical data.

* * * * *